US009061560B2

(12) United States Patent
Savaresi et al.

(10) Patent No.: US 9,061,560 B2
(45) Date of Patent: Jun. 23, 2015

(54) METHOD AND SYSTEM OF CONTROLLING THE STABILITY OF A TWO-WHEELED VEHICLE BY ELECTRONICALLY ADJUSTABLE SUSPENSION

(75) Inventors: Sergio Matteo Savaresi, Cremona (IT); Pierpaolo De Filippi, Mornico Losana (IT); Diego Delvecchio, Milan (IT)

(73) Assignee: E-SHOCK S.R.L, Milan (IT)

( * ) Notice: Subject to any disclaimer, the term of this patent is extended or adjusted under 35 U.S.C. 154(b) by 0 days.

(21) Appl. No.: 14/342,580

(22) PCT Filed: Sep. 4, 2012

(86) PCT No.: PCT/IB2012/054557
§ 371 (c)(1),
(2), (4) Date: Mar. 10, 2014

(87) PCT Pub. No.: WO2013/046079
PCT Pub. Date: Apr. 4, 2013

(65) Prior Publication Data
US 2014/0236425 A1  Aug. 21, 2014

(30) Foreign Application Priority Data
Sep. 26, 2011   (IT) .............................. MI2011A1729

(51) Int. Cl.
*B60G 17/015*   (2006.01)
*B62K 25/04*   (2006.01)

(52) U.S. Cl.
CPC .............. *B60G 17/015* (2013.01); *B62K 25/04* (2013.01); *B62K 2025/044* (2013.01)

(58) Field of Classification Search
USPC .............. 280/5.5, 5.502, 5.504, 5.506, 5.507; 180/271, 282; 701/1, 36, 38, 48, 69, 701/70, 71, 72, 78, 79, 80, 82, 83, 84, 87, 701/90, 124
See application file for complete search history.

(56) References Cited

U.S. PATENT DOCUMENTS

| | | | |
|---|---|---|---|
| 6,899,193 B1 | 5/2005 | Anibas | |
| 2008/0227365 A1* | 9/2008 | Lo | ................................ 446/440 |

FOREIGN PATENT DOCUMENTS

| | | |
|---|---|---|
| DE | 102008006051 A1 | 7/2009 |
| JP | 1172093 A | 7/1989 |
| JP | 1229790 A | 9/1989 |

OTHER PUBLICATIONS

International Search Report and Written Opinion in PCT/IB2012/054557 dated Dec. 3, 2012.

* cited by examiner

*Primary Examiner* — Thomas Tarcza
*Assistant Examiner* — Edward Pipala
(74) *Attorney, Agent, or Firm* — Manelli Selter PLLC; Edward J. Stemberger

(57) ABSTRACT

The present invention relates to a method of controlling the stability of a two-wheeled vehicle including a first wheel associated with a first suspension and a second wheel associated with a second suspension. The method includes: detecting a signal representing the roll angle and detecting a signal representing the roll angular speed of the vehicle; detecting a signal representing the first force imposed on the first suspension; detecting a control signal representing the reference force to impose to the second suspension according to the signals representing the roll angle, of the roll angular speed and the first force. The present invention is also related to a system for controlling the stability of a two-wheeled vehicle.

12 Claims, 6 Drawing Sheets

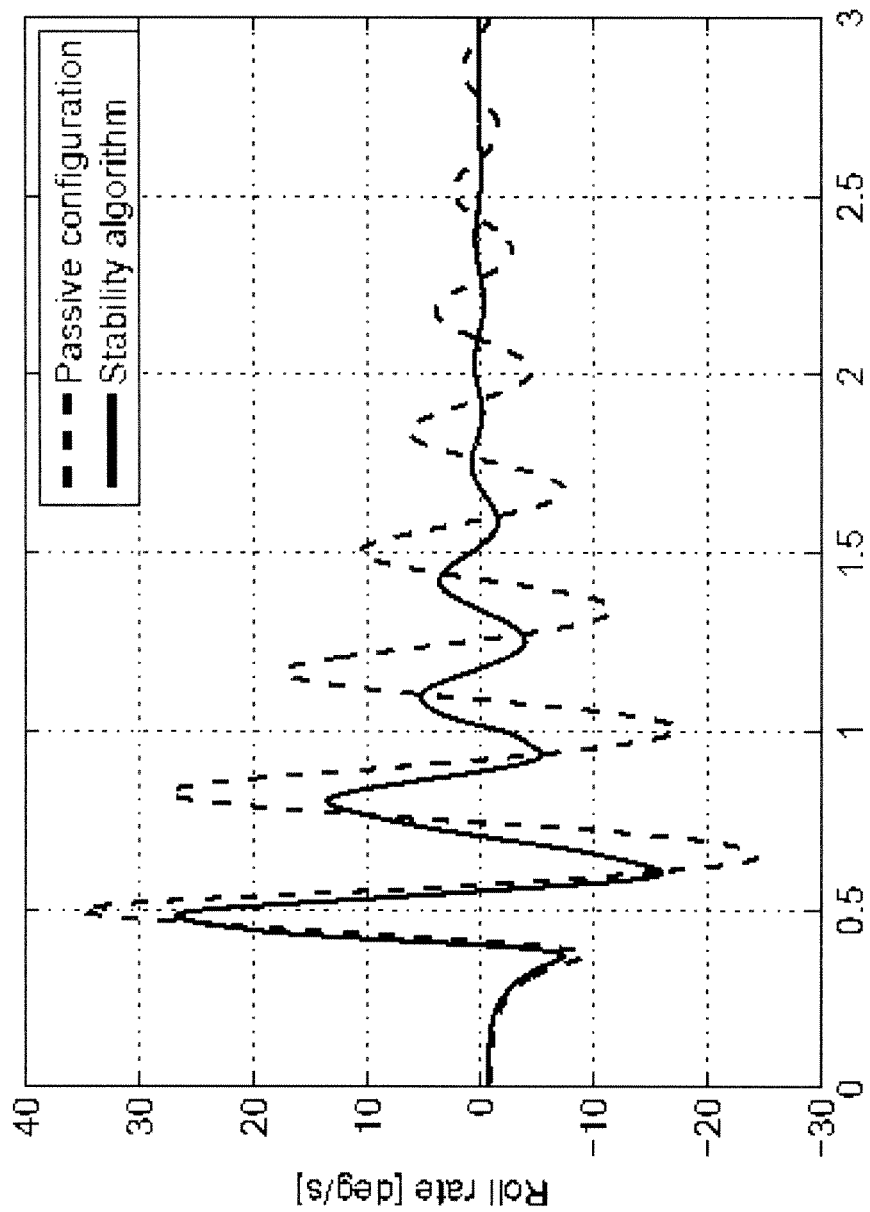

METHOD AND SYSTEM OF CONTROLLING THE STABILITY OF A TWO-WHEELED VEHICLE BY ELECTRONICALLY ADJUSTABLE SUSPENSION

BACKGROUND OF THE INVENTION

The present invention relates to a method and a system of controlling the stability of a two-wheeled vehicle, especially a motorbike, by acting on the forces provided by the front and the rear suspensions.

PRIOR ART

Control systems of motorbike organs are known in order to increase the safety or the comfort.

Examples of control systems are traction and braking control of the motorbike in order to increase the safety and the ease of driving.

Control systems of motorbike suspension have also been developed mainly to increase comfort. Acting appropriately on suspensions can reduce the vertical oscillation of the motorbike when it encounters street irregularities such as bumps or railroads ties.

SUMMARY OF THE INVENTION

Nevertheless, known control systems do not enable to obtain an appropriate control of the motorbike stability, i.e. a decrease of oscillations around the longitudinal axis, which could undermine the safety in case of sudden high speed manoeuvres.

Therefore, the object of this invention is to provide a system and a method of control of the dynamics concerning the longitudinal axis of a two-wheeled vehicle such as to provide a sufficient stability and an adequate security to the vehicle even in case of sudden manoeuvres or loss of optimal set-up.

This and other objects are achieved by a stability control method of a two-wheeled vehicle according to claim 1 and stability control system of a two-wheeled vehicle according to claim 8.

The dependent claims define possible and advantageous embodiments of the invention.

BRIEF DESCRIPTION OF THE FIGURES

To understand completely the invention and to appreciate its advantages, some exemplary non-limiting embodiments will be described below with reference to the attached figures, wherein:

FIG. 6 shows a comparison between the results of simulated stability tests on a vehicle equipped with a control system according to the invention and a vehicle without such a system.

DETAILED DESCRIPTION OF THE INVENTION

Figure 1A:
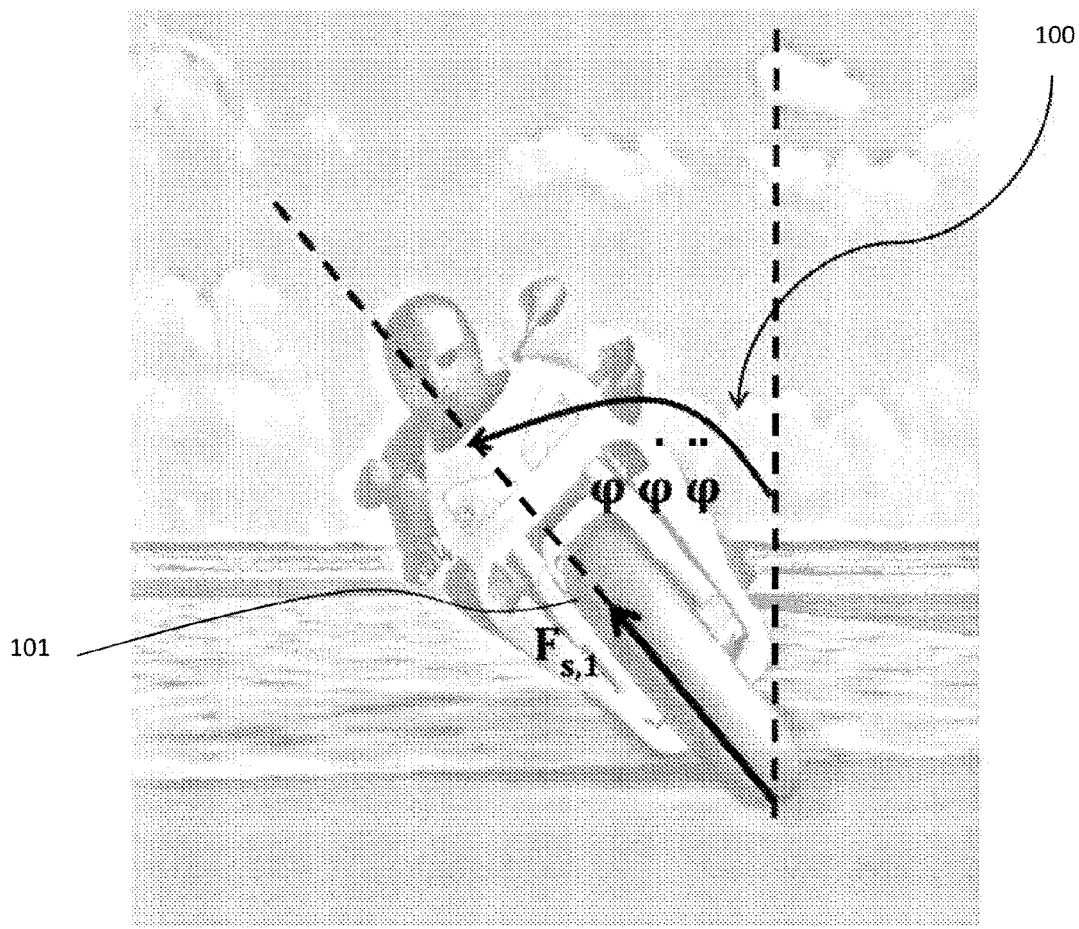
FIGS. 1*a*, 1*b* e 1*c* are schematic views of the front, the front side and the rear side respectively of a two-wheeled vehicle during use.

According to FIG. 1, a two-wheeled vehicle, such as a motorbike, is indicated with the reference 100.

The motorbike comprises a first wheel 101 and a second wheel 102, for example the front wheel and the rear wheel, respectively. However, it is to be noted that in the present description and in the enclosed claims, first wheel 101 and second wheel 102 may indicate the rear wheel and the front wheel as well, respectively. Each of the two wheels is associated with a suspension. In particular, the first wheel 101 is associated with a first suspension 103, while the second wheel 102 is associated with a second suspension 104.

During motion, in particular while swerving, vehicle 100 is sloped by a roll angle $\phi$, conventionally measured from the vertical referred to the position of vehicle in normal use. A roll angular speed $\dot\phi$ as well as a roll angular acceleration $\ddot\phi$ are naturally associated to the vehicle crease. It is to be noted that in the present description and in the enclosed claims, it is assumed that the roll angle $\phi$, the roll angular speed $\dot\phi$ and the roll angular acceleration $\ddot\phi$ have positive sign when oriented according to the convection illustrated in FIG. 1*a*.

Forces act on both suspensions every moment. In particular, a first force $F_{s,1}$ acts on the first suspension, while a second force $F_{s,2}$ acts on the second suspension. These forces generally change in time t if the vehicle 100 is moving.

When vehicle 100 moves, suspensions oscillate and are therefore characterized by an elongation speed that is variable. In particular, the first suspension 103 is associated with a first elongation speed $\dot x_1$, while the second suspension 104 is associated with a second elongation speed $\dot x_2$. It is to be noted that, in the present description and in the enclosed claims, it is conventionally assumed that the forces acting on the suspensions have a positive sign if they have the direction indicated conventionally in the FIGS. 1*a* e 1*b*. A similar convention of sign is assumed for the elongation speed of the suspensions.

The system and the method according to the invention enable the control of the vehicle stability by acting on its suspensions, in particular by imposing them forces determined on the basis of measurement of kinematic and dynamic parameters of the vehicle during its motion.

Suspensions, suitable for being associated to the control system according to the invention and used in the control method according to the invention, are preferably electronically adjustable suspensions, that means suspensions in which the force exerted can be electronically selected and modified during use. Examples of such suspensions are the semi-active electro-hydraulic, magneto-rheological or electro-rheological. In these kinds of suspensions it is possible to act on the damping coefficient by sending an appropriate drive signal. However, it is to be noted that the control system according to the invention can be also associated to suspensions of other kind, for example active suspensions, on condition that a desired force could be imposed.

In order to make possible the control of the vehicle by an appropriate imposition of forces to one or both suspensions, the vehicle can be associated with one or more sensors or, more generally, with means for detecting cinematic and dynamic quantities of the vehicle. It is to be noted that the expression "detecting means" doesn't include only sensors suitable for making direct measurements, but also means suitable for determining a quantity indirectly, for example suitable for calculating this quantity from the measurement of another quantity related to it, as the examples below can clarify. In this second case, the detecting means can be implemented using hardware devices, or a combination of hardware and software.

In particular, sensors or detecting means of one or more of the following quantities may be combined to the vehicle:

roll angle of the vehicle $\phi$: it can be measured directly by specific sensors or be obtained indirectly from the measurement of the roll angular speed or from the measurement of other related quantities;

Roll angular speed of the vehicle $\dot{\phi}$: it can be measured directly, for example by a gyrometer, or indirectly for example from the roll angle $\phi$;

Roll angular acceleration $\ddot{\phi}$: it can be measured directly, for example by appropriate inertial sensors, or it can be determined indirectly for example starting from the roll angular speed;

Elongation speed of the suspensions $\dot{x}_1$, $\dot{x}_2$: it can be determined indirectly from measurements, for example of position using sensors such as linear potentiometers and subsequent numerical differentiation or for example from acceleration measures using sensors such as accelerometers;

Forces of the suspension $F_{s,1}$ and $F_{s,2}$: they can be measured directly by specific force sensors or indirectly, for example from accelerations measured by accelerometers.

Figure 2:
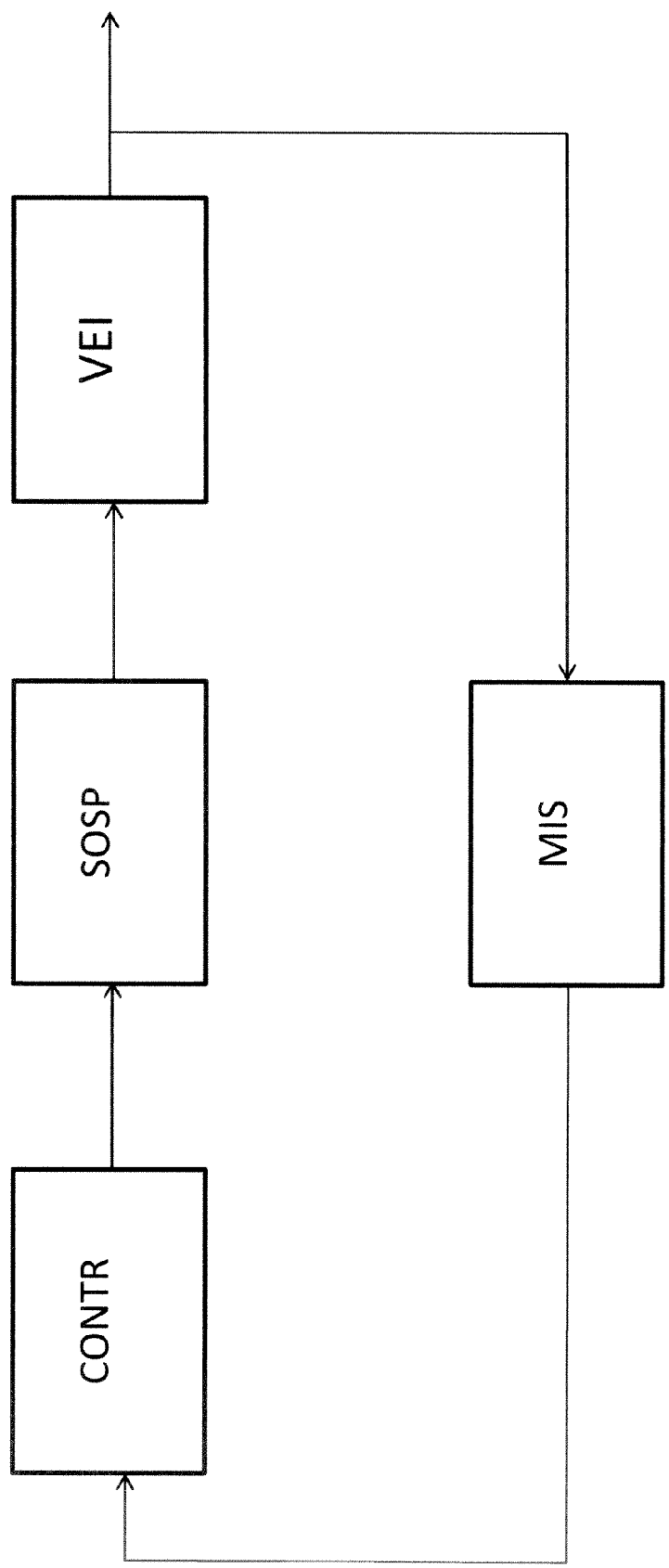
FIG. 2 shows a basic diagram of a stability control system of a two-wheeled vehicle according to the invention.

FIG. 2 shows a basic diagram of the control system of the vehicle according to the invention by functional blocks. In particular, according to the basic scheme, a control block CONTR receives information related to cinematic and dynamic quantities of the vehicle from a block of measurement MIS, measured in the above-mentioned way, and consequently it can control the suspensions of the vehicle (suspensions block SOSP). Appropriate forces, illustrated here below, will be then imposed to the suspensions. As a result of these regulations, the vehicle (block VEI) changes its setup. Control, then, continues in a cyclic way according to this scheme.

Detailed Description of the Control System of the Vehicle Stability

Figure 3:
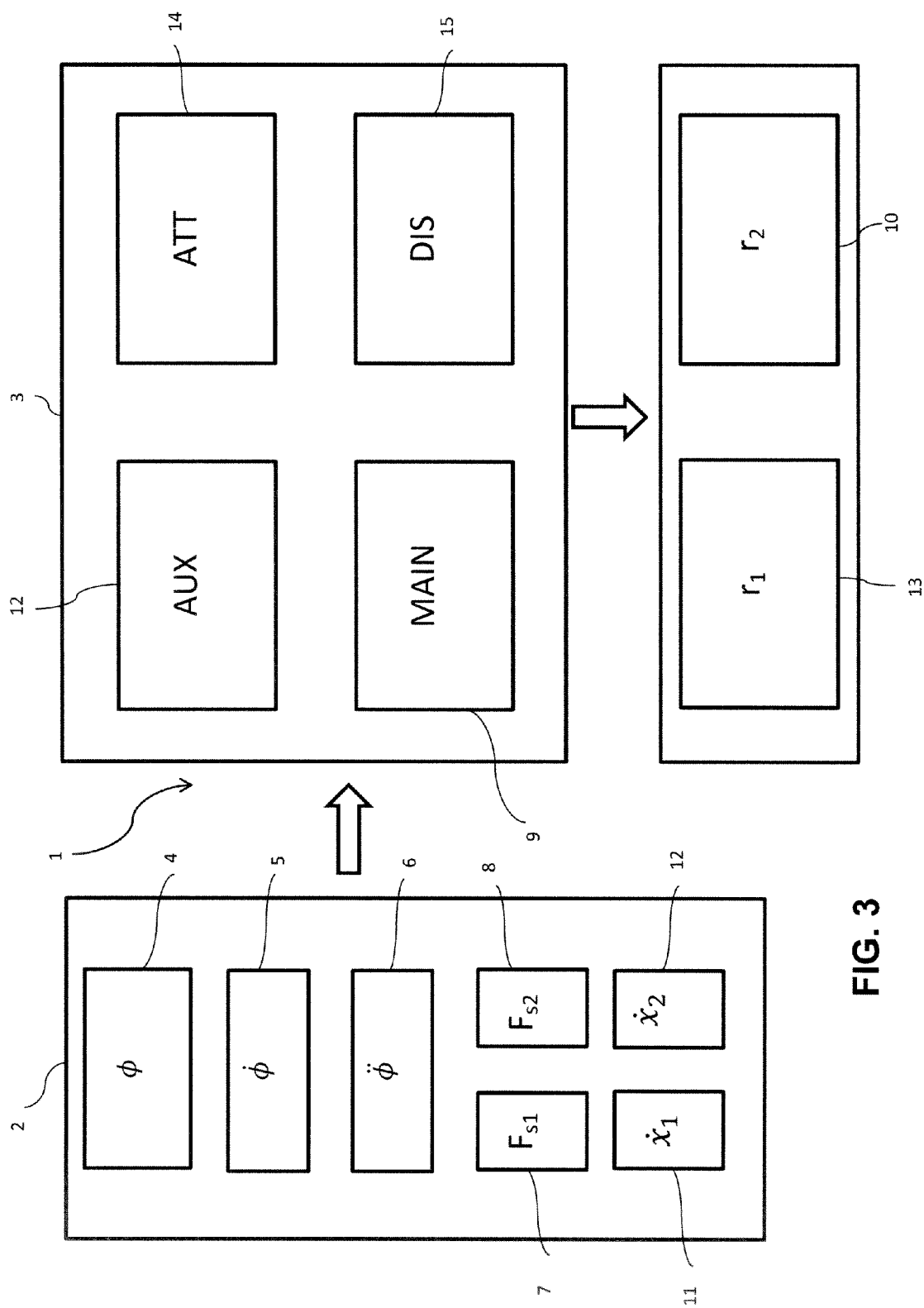
FIG. 3 shows a schematic illustration of a stability control system of a two-wheeled vehicle according to a possible embodiment of the invention.

With reference to the embodiment illustrated in FIG. 3, the stability control system of the vehicle according to the invention will now be described in details.

The control system, indicated as a whole with the reference 1, comprises one or more modules for the detection of significant quantities of the vehicle during its motion (that group of modules is generally designated by the reference 2), in particular one or more of the above indicated quantities, and one or more modules for the effective control of the suspensions in order to achieve the control of the stability of the vehicle (this group of modules is indicated as whole with the reference 3).

More in detail, the control system comprises means 4 for detecting the roll angle $\phi$, and means 5 for detecting the roll angular speed $\dot{\phi}$ of the vehicle. Moreover, according to a possible embodiment, the control system comprises means for detecting the angular acceleration $\ddot{\phi}$ of the vehicle. Such means for detecting the above indicated quantities may comprise sensors able to measure directly the quantities indicated or may comprise modules for the indirect determination of one or more of these quantities from the actual measurement of a quantity by a sensor, as mentioned earlier. For example, the roll angular speed $\dot{\phi}$ can be obtained by appropriate filtering of the measured roll angle $\phi$ and therefore it is not essential to provide a sensor specifically dedicated to this size.

The measurement system in addition includes means 7 for detecting the first force $F_{s,1}$ exerted by the first suspension and preferably means 8 for detecting the second force $F_{s,2}$ exerted by the second suspension. These detection means of the forces $F_{s,1}$ and $F_{s,2}$ may, for example, include the force sensors previously described.

According to a possible embodiment, the control system further comprises means 11 for detecting the elongation speed of the first suspension $\dot{x}_1$ and means 12 for detecting the elongation speed of the second suspension $\dot{x}_2$. These means may include for example the linear speed sensors mentioned above.

The detecting means of the sizes indicated above, whether sensors or modules, for their determination or combinations are suitable to generate signals, such as electrical signals, representing the measured quantity. These signals may be continuous or discrete, digital or analogical. These signals are transmitted to the module group 3, for their processing. Among the modules in communication each other can be optionally provided for appropriate signal converters. For example, in the case in which the detecting means are sensors that emit an analogical electrical signal that must be processed by a digital microprocessor, appropriate A/D converters may be provided. Signals are acquired in this case with a certain sampling frequency.

The control system 1 comprises a main drive module 9 (MAIN) which receives as input the signals representing the roll angle $\phi$, the roll angular speed $\dot{\phi}$ and the first force $F_{s,1}$, exerted in a certain moment in time by the first suspension. On the basis of these signals, and therefore on the basis of direct measurement or indirect determination of the quantities represented by those signals, the main drive module 9 is able to determine by means of an appropriate mathematical algorithm a reference force $F_{s,2}^0$ to be imposed to the second suspension, such as to stabilize the oscillations of the vehicle around its longitudinal axis. The main drive module 9 is also able to generate a control signal representing the reference force $F_{s,2}^0$ to be sent to the second suspension, such that this carries the reference force $F_{s,2}^0$ calculated by the above-mentioned mathematical algorithm. In the case where, for example, the suspension is of the semi-active type, this signal is sent to a module 10 for actuating the second suspension capable of changing the damping coefficient $r_2$ of the second suspension in such a way that this carries the reference force $F_{s,2}^0$.

t is to be noted that in such suspensions, in order to ensure that the force exerted is actually the one imposed, it is necessary that the main drive module 9 is also provided as input with the speed of elongation, since the viscous force exercised by the suspension depends on this size. The elongation speed $\dot{x}_2$ of the second suspension is detected in particular by the detecting means 12, which provide the main drive module 9 with a representative signal thereof. In the case where the control signal of the second suspension, representing the reference force $F_{s,2}^0$, provided by the main drive module 9, is digital and the actuating module 10 operates with analogical electrical signals, between them a D/A converter (not shown in figure) can be for example provided.

In the case of suspensions of different nature, the signal representing the reference force $F_{s,2}^0$ can act differently on the suspension. For example, in the case of active suspension equipped with an actuator operatively placed in parallel to the spring, the signal representing the reference $F_{s,2}^0$ force acts on mentioned actuator.

The reference force $F_{s,2}^0$ to be imposed to the second suspension is chosen in such a way as to cause the roll angular speed $\dot{\phi}$ of the vehicle to be minimized. In particular, the reference force $F_{s,2}^0$ is such as to generate a torque with respect to the longitudinal axis of the vehicle such as to damp the oscillations around the longitudinal axis of the vehicle due to the torques generated by the forces acting on the vehicle during its motion. If the torques are referred to a longitudinal axis passing through the centre of gravity of the vehicle, such forces include substantially the forces that are generated as a result of the contact between the tires of the two wheels and the road, that can generate instability, for example in presence of humps or bumps.

According to a preferred mathematical algorithm, the reference force $F_{s,2}^0$ is obtained by the contribution of a first term A function of the force exercised by the first suspension $F_{s,1}$, and a second term B function of the roll angle of the vehicle $\phi$ and the roll angular speed of the vehicle $\dot{\phi}$ at the instant of time t considered:

$$F_{s,2}^0(t) = A(F_{s,1}(t)) + B(\phi(t),\dot{\phi}(t))$$

Figure 1B:
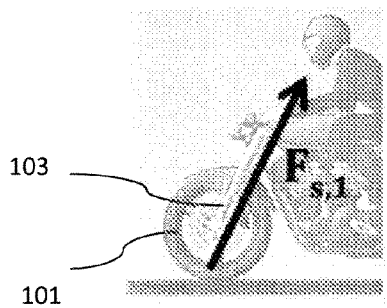
Figure 1C:
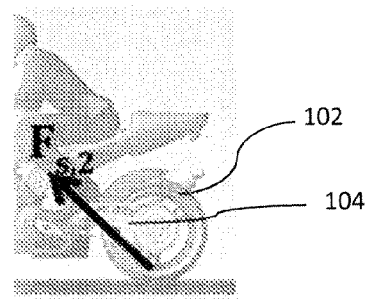

With reference to FIGS. 1a-1c with regard to the signs of the above mentioned measures, the first term A and the second term B are chosen in such a way that:

the first term A is in absolute value increases as the absolute value of the force exerted by the first suspension increases and has opposite sign in comparison to the sign of the force exerted by the first suspension $F_{s,1}$;

the second term B increases in absolute value as the absolute value of the roll angle of the vehicle increases and it has the sign opposite to the sign of the roll angle of the vehicle $\phi$ if the roll angular speed $\dot{\phi}$ is positive, while it has the same sign of the roll angle of the vehicle $\phi$ if the roll angular speed $\dot{\phi}$ is negative. Furthermore, preferably, the second term B increases in absolute value as the absolute value of the angular roll speed $\dot{\phi}$ increases. If needed, the second term B can be further amplified by an amplification factor, which can be for example a predetermined calibration parameter, possibly adjustable by the user to vary the response of the vehicle.

In the accordance with a possible embodiment, according to the mathematical algorithm used by the main drive module 9, the reference force $F_{s,2}^0$ is the result of following formula (1):

where:

$$F_{s,2}^0(t) = -F_{s,1}(t) - \frac{1}{\cos^2(\phi(t))}\text{sgn}(\phi(t))\tilde{c}_{roll}\dot{\phi}(t) \qquad (1)$$

$F_{s,2}^0$ is the reference force to be imposed to the second suspension;
$F_{s,1}$ is the force exerted by the first suspension;
$\phi$ is the roll angle of the vehicle;
$\dot{\phi}$ is the roll angular speed of the vehicle;
$\tilde{c}_{roll}$ is a predetermined calibration parameter, possibly adjustable to vary the response of the vehicle; for example, the user can vary this parameter among predetermined values according to his driving style.
t is the considered point of time.

The term sgn($\phi$(t)) is present to distinguish between cases of bends to the left or right of the vehicle, to which correspond roll angles of different sign.

According with the formula (1), the first term A and the second term B previously introduced have the following formulas:

$$A = -F_{s,1}(t);$$

$$B = -\frac{1}{\cos^2(\phi(t))}\text{sgn}(\phi(t))\tilde{c}_{roll}\dot{\phi}(t)$$

In this description's Appendix, the steps that led to the determination of the formula (1) are described.

Obviously the formula (1) above mentioned can be substituted by formulas that are not specifically shown but that can have similar trend, such as its polynomial approximations. As an alternative, it is possible to use a not approximate version of the formula (1), as it will be clear to those skilled in the art from a reading of the Appendix attached.

Figure 4:
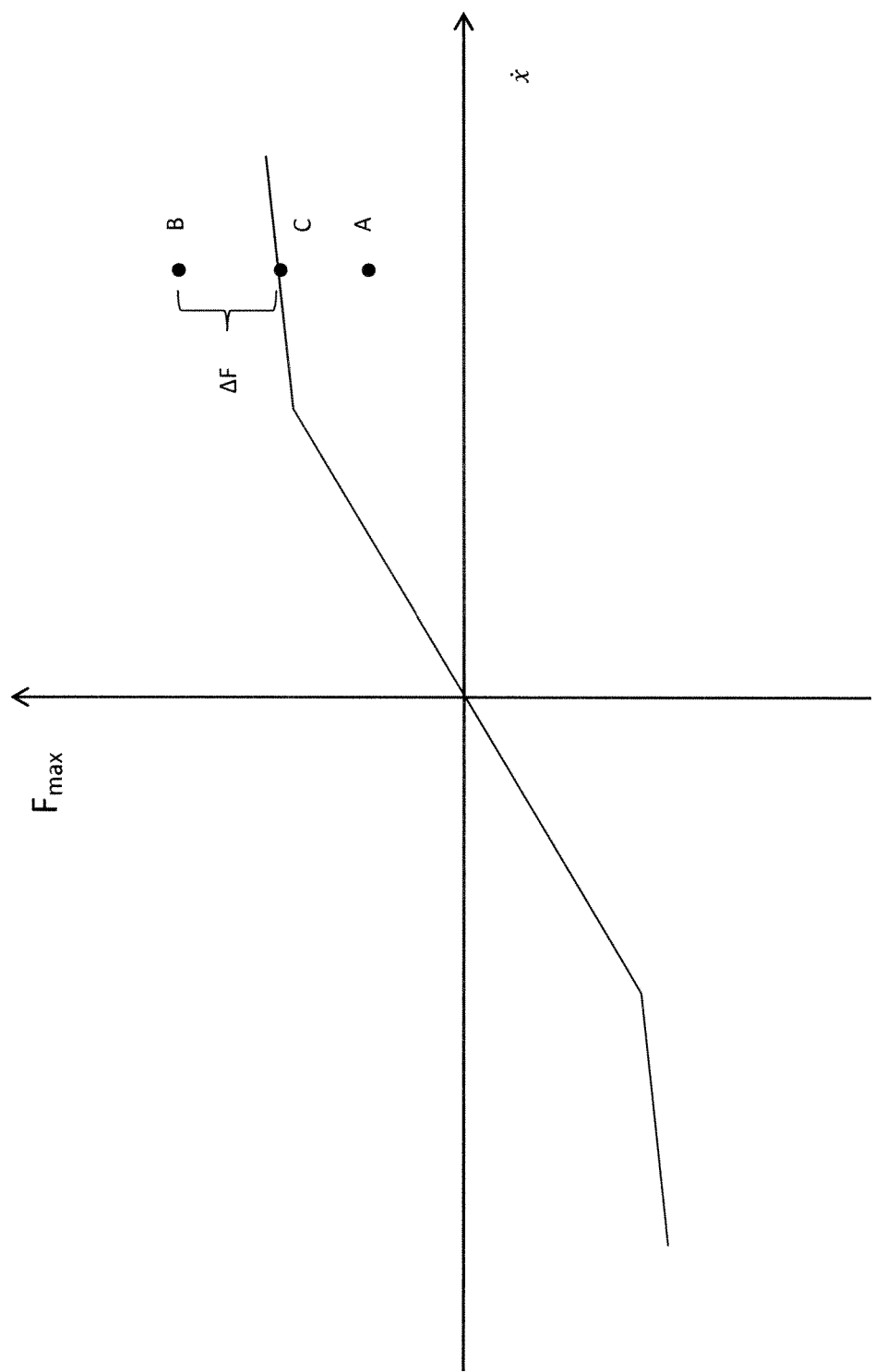
FIG. 4 shows a qualitative illustration of the characteristic force-speed of elongation of a suspension.

Because of their physical characteristics, the suspensions are not always able to reach the reference force imposed by the chosen mathematical algorithm. In particular, in general the maximum force $F_{max}$ exercisable from the second suspension has a trend of the type shown qualitatively in FIG. 4, and varies with its elongation speed $\dot{x}$. If the reference force $F_{s,2}^0$, that must be imposed to the suspension while this one is moving with a certain speed of elongation, is in absolute value less than or equal to the absolute value of the maximum force which can be exercised, the suspension is able to exert such a force. The situation is represented for example at point A in FIG. 4. Nevertheless, if the reference force $F_{s,2}^0$ is in absolute value higher than the absolute value of the maximum force which can be exercised at that particular elongation speed (point B in FIG. 4), the suspension is able at most to exert that particular maximum force for that specific speed of elongation (point C in FIG. 4). Therefore, for the purpose of control by the portion of force $\Delta F$ is lost by the suspension.

In order to overcome this problem, advantageously, the control system 1 comprises an auxiliary drive module 12 (AUX) suitable to drive the first suspension in such a way to impose on it an auxiliary reference force $F_{s,1}^0$ that can compensate at least in part the portion of force $\Delta F$ that cannot be imposed for the reasons given above to the second suspension of the vehicle. In particular, the auxiliary drive module 12 is suitable to generate a drive signal representing the auxiliary reference force $F_{s,1}^0$ to be imposed to the first suspension when the reference force $F_{s,2}^0$ is unattainable by the second suspension.

The action ways of the signal control, representing the auxiliary reference force $F_{s,1}^0$ on the first suspension, are similar to those described with reference to the second suspension. In particular, if the first suspension is of the semi-active type, this signal is supplied to an actuation module 13 of the first suspension which acts on the latter by changing the damping coefficient $r_1$ in such a way that this carries the force of the auxiliary reference force $F_{s,1}^0$. In order to do this, the elongation speed $\dot{x}_1$ of the first suspension must be detected, in particular by the detecting means 11 that provide the auxiliary drive module 12 with a signal representing the elongation speed itself. Also in this case, a D/A converter can be provided, if a conversion of the drive signal representing the auxiliary reference force $F_{s,1}^0$ between the auxiliary drive module 12 and the drive module 13 of the first suspension is necessary.

If the first suspension is of a different nature, for example an active one, the drive signal representing the auxiliary reference force $F_{s,1}^0$ will act on it in the way described above with reference to the second suspension.

According to a possible embodiment, according to the mathematical algorithm used by the auxiliary drive module 12, the auxiliary reference force $F_{s,1}^0$ that must be imposed to the first suspension is determined according to the following formula (2):

$$F_{s,1}^0(t) = F_{s,1,max} + (F_{s,2}^0(t) - F_{s,2}(t)) \qquad (2)$$

where:
$F_{s,1}^0(t)$ is the auxiliary reference force imposed to the first suspension;

$F_{s,1,max}$ is the maximum force available from the first suspension;

$F_{s,2}^0$ is the reference force imposed to the second suspension;

$F_{s,2}$ is the effective force exerted by the second suspension;

t is the considered point of time.

It is to be noted that the control of the first and of the second suspension may be made in open loop or closed loop. For example, with reference to the case of semi-active suspensions, once the required current value is identified to impose the damping coefficient such that the suspension carries the desired force, it is possible to make a closed loop control of such current so as to ensure a rapid response of the suspension and error equal to zero or substantially zero in a steady state.

In order not to compromise the driveability of the vehicle, it is preferable that the control system is active only in need, and that, similarly, it is turned off once the roll has been stabilized.

To this purpose, advantageously, the control system comprises a module 14 (ATT) for enabling it. This enabling module 14 is suitable to generate an activation signal when in the vehicle certain conditions occur which make it necessary to control the vehicle dynamics. A first condition is that the vehicle is actually curving and that therefore the roll angle φ is, as an absolute value (and therefore regardless of the direction of steering of the vehicle), not nil or greater than or equal to a predetermined threshold roll angle $\phi_{th}$. Alternatively or in addition, a further condition that can be set for the activation of the control is that the vehicle is oscillating at high frequency, that is at a frequency greater than or equal to a predetermined threshold frequency. In fact, the oscillations to be dampened are the high frequency ones, while those with a low frequency, unavoidable because of the trajectory variations imposed during the driving of the vehicle, are not in general to be damped. The oscillation frequency of the vehicle can be measured or determined by appropriate means for detecting the frequency, not shown in Figures. As an alternative, preferably, the enabling module 14 is suitable to determine through an appropriate mathematical algorithm a frequency function f from the signals representing the roll angular acceleration $\ddot{\phi}$, the roll angular speed $\dot{\phi}$ and the roll angle φ, measured or determined respectively by the detecting means 6 of the roll angular acceleration $\ddot{\phi}$, by the detecting means 5 of the roll angular speed $\dot{\phi}$ and by the detecting means 4 of the roll angle φ. The activation module 10 then generates the activation signal of the roll control when the frequency function f is greater than or equal to a threshold frequency function value $f_{th}$ (which corresponds to an oscillation frequency greater than or equal to the threshold frequency function value) and when the roll angle φ is greater than or equal to the roll angle threshold $\phi_{th}$ predetermined as absolute value. Once the activation signal is generated by the activation module 14, the main drive module 9 and/or the auxiliary drive module 12 are activated.

According to an embodiment, on the basis of the mathematical algorithm used by the activation module 14, the frequency function f is given by the following formula (3):

$$f(t) = \ddot{\phi}^2(t) - \alpha^2 \dot{\phi}^2(t) \quad (3)$$

wherein:

$\ddot{\phi}$ is the roll angular acceleration of the vehicle;

$\dot{\phi}$ is the roll angular speed;

α is a predetermined setting parameter, possibly variable to change the modality of the control system activation;

t is the considered point of time.

With further advantage, in order ti disable the roll control when the vehicle oscillations are damped, the system also comprises a deactivation module 15 (DIS). The deactivation module 15 is suitable to generate a deactivation signal when certain conditions, representing the fact that its oscillations have been adequately damped, occur in the vehicle. A first condition is that the vehicle is not substantially curving and that therefore the absolute value of the roll angle φ is substantially null or less than the predetermined threshold roll angle $\phi_{th}$. Alternatively or in addition, a further condition that can be set for deactivating the control by the deactivation module 15 is that the oscillation power is low, that is less than a predetermined oscillations threshold power. In fact if this power is low the residual oscillations due to instability have been sufficiently damped.

Preferably, the deactivation control module 15 is suitable to determine by an appropriate mathematical algorithm an oscillation power function P from the signals representing the roll angular speed $\dot{\phi}$ and the roll angle φ of the vehicle, measured or determined by the detecting means 5 of the roll angular speed $\dot{\phi}$ and by detecting means 4 of the roll angle φ respectively. The deactivation module 15 generates the deactivation signal of the roll control when the oscillation power function P is lower than an oscillation power function threshold value $P_{th}$ and/or when the roll angle φ is lower as absolute value than a predetermined roll angle threshold $\phi_{th}$. Once the deactivation signal is generated by the deactivation module 15, the main drive module 9 and the auxiliary drive module 15, if active, are deactivated.

According to an embodiment, according to the mathematical algorithm used by the deactivation module 15, the oscillation power function P is given by the following formula (4):

$$P(t) = \frac{1}{N}\sum_{k=1}^{N}\dot{\phi}^2(t-k) \quad (4)$$

wherein:

N is the number of samples used (in fact the power is preferably calculated in N discrete instants of time, in which is detected the roll angular speed);

$\dot{\phi}$ is the roll angular speed;

t is the considered point of time.

It is to be noted that the main drive module 9, the drive module 10 of the second suspension, the auxiliary drive module 12, the drive module 13 of the first suspension, the activation module 14 and the deactivation module 15 can be implemented by using hardware devices, by software or by a combination of hardware and software.

Figure 5:
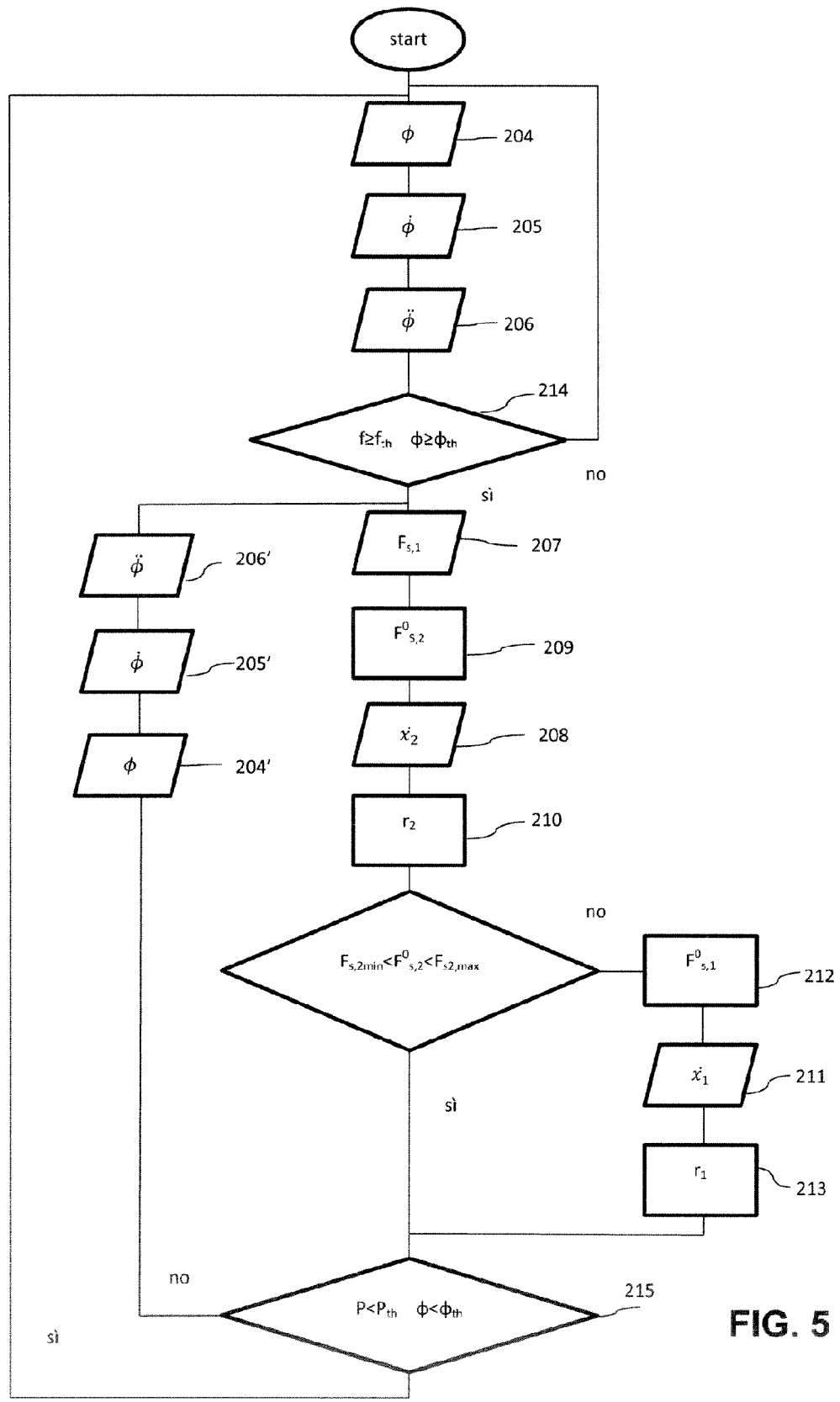
FIG. 5 shows a flowchart that refers to a stability control method of a two-wheeled vehicle according to an embodiment of the invention.

Detailed Description of the Method for Controlling the Stability of a Two-Wheeled Vehicle With reference to the flowchart in FIG. 5, now a method for controlling the stability of the vehicle according to the invention will be described in detail.

After a symbolic start-up step (Start), which may correspond for example to the vehicle startup if the method execution is automatic, or may correspond to the activation of a specific order given by a user, the method comprises a step 204 of detecting the signal representing the roll angle φ and a step 205 of detecting the signal representing the roll angular speed $\dot{\phi}$ of the vehicle. These steps may be realized by the detecting means 4 of roll angle φ and by the detecting means 5 of the roll angular speed $\dot{\phi}$. As mentioned above, these as well as the further detection steps that will be mentioned below may include a proper measurement by sensors of the size to be determined or by an indirect determination thereof staring from the measurement of other variables.

Optionally, the method may include a step 206 of detecting the signal representing the roll angular acceleration $\ddot{\phi}$, for example realizable by the detecting means 6 of the roll angular acceleration $\ddot{\phi}$. The latter size may be exploited for the determination of the frequency function f, if this is used to verify if the activation conditions of the method exist.

In particular, preferably, the method comprises an step 214 of activating the control, in particular by generating an activation control signal by the activation module 14, if activation conditions occur. Advantageously, the roll control is activated if the roll angle $\phi$ is greater than or equal to the predetermined threshold roll angle $\phi_{th}$ as absolute value and when the frequency oscillation of the vehicle is greater than the minimum predetermined threshold frequency. According to a possible embodiment, the verification of the frequency can be realized by a step of determining the frequency function f, for example, calculated according to the formula (3), starting from the roll angular acceleration $\ddot{\phi}$ and the roll angular speed $\dot{\phi}$. If the frequency function f is greater than or equal to the value of the predetermined threshold frequency function $f_{th}$, the oscillation frequency is greater than the threshold frequency.

If the required conditions for the step of activating 214 do not occur, the control does not take place until these conditions are not satisfied.

In case these conditions occur, the control takes place and the control method continues with further steps.

In particular, the control method comprises a step 207 of detecting the signal representing the first force $F_{s,1}$ exerted by the first suspension. This step 207 may be performed by the detecting means 207 of the first force.

Depending on the signals representing the roll angle $\phi$, the roll angular speed $\dot{\phi}$ and the first force $F_{s,1}$ the control signal representing the reference force $F_{s,2}^0$ to be imposed to the second suspension is determined in a corresponding step 209. The reference force $F_{s,2}^0$ and the corresponding signal representing it may be determined by the main drive module 9. Advantageously, the reference force $F_{s,2}^0$ has the properties previously described and can be determined in a step in which the main drive module 9 applies a suitable mathematical algorithm. According to a possible embodiment, the reference force $F_{s,2}^0$ is calculated by the formula (1).

In the case in which the second suspension is of the a semi-active type, the drive signal representing the reference force $F_{s,2}^0$ is suitable to modify the damping coefficient $r_2$. In order to determine this signal, the method may comprise a step 212 of detecting a signal representing the elongation speed of the second suspension $\dot{x}_2$, for example by the detecting means 12 of the latter. Starting to the reference force $F_{s,2}^0$ and the elongation speed detected in the above mentioned ways, it is possible to determine the correct control signal representing the reference force $F_{s,2}^0$ suitable to modifying in an exact way the damping coefficient $r_2$ of the second suspension in a corresponding step 210 of the method. The step 210 of modifying the damping coefficient $r_2$ can be carried out by the drive module 10 of the second suspension.

In the case where the reference force $F_{s,2}^0$ is not reachable by the second suspension because of the physical limits above mentioned, the missing portion $\Delta F$ can be imposed at least partially to the first suspension.

To this end, the method comprises a step 212 of determining the control signal representing the reference force $F_{s,1}^0$ to be imposed to the first auxiliary suspension. The auxiliary reference force $F_{s,1}^0$ and the corresponding signal representing it may be determined by the auxiliary drive module 12. Advantageously, the auxiliary reference force $F_{s,1}^0$ has the properties above mentioned and may be determined in a step in which the auxiliary drive module 12 applies a suitable mathematical algorithm. According to a possible embodiment, the auxiliary reference force $F_{s,1}^0$ is calculated by the formula (2).

In the case where the first suspension is semi-active, the drive signal representing the auxiliary reference force $F_{s,1}^0$ is suitable to modify the damping coefficient $r_1$. To this end, the method may comprise a step 211 in which you detect a signal representing the elongation speed of the first suspension $\dot{x}_1$, in particular by the detecting means 11 of the latter. Starting from the auxiliary reference force $F_{s,1}^0$ to be imposed and from the elongation speed detected in the ways above mentioned, it is possible to determine the correct drive signal representing the auxiliary reference force $F_{s,1}^0$ suitable to modify in an exact way the damping coefficient $r_1$ of the first suspension in a corresponding step 213 of the method. The step 213 of modifying the damping coefficient $r_1$ may be carried out by the drive module 13 of the first suspension.

Whether it was necessary to impose the auxiliary reference force $F_{s,1}^0$ to the first suspension, or this step has not been performed because the second suspension was able to exert the reference force $F_{s,2}^0$, the imposition of one or both of these forces modifies the vehicle setup. However it is preferable to determine if the conditions that require the activation of the control occur always, or if the vehicle is stabilized and therefore it is possible to deactivate the control. The control is deactivated when the roll angle $\phi$ is zero or lower as absolute value than the predetermined threshold angle $\phi_{th}$, and/or if the oscillation is sufficiently damped. This latter condition can be verified by comparing the oscillation power, for example, calculated according to the formula (4), with a predetermined oscillation power threshold value.

Advantageously, the method therefore comprises a step of disabling the roll control when the above-mentioned conditions occur. More in detail, according to a possible embodiment, this step of disabling the roll control comprises a step 215 of determining the oscillation power function P starting from the roll angular speed $\dot{\phi}$. When the power oscillation function P is lower than the predetermined power oscillation function value $P_{th}$, the oscillation power of the vehicle is lower than the predetermined oscillation power threshold and the control can be deactivated. The determination of the oscillation power function P and its comparison with the of oscillation power function threshold value $P_{th}$ can be realized by the deactivation module 15.

In the case where the deactivation conditions occur, according to the method it is possible to continue to detect the roll angle $\phi$, the roll angular speed $\dot{\phi}$ and the roll angular acceleration $\ddot{\phi}$, but the control of the suspensions (step 207 and following) is reactivated only when the activation conditions required in step 214 occur again. Vice versa, the control can continue cyclically with additional steps of detection of the roll angle, roll angle speed and roll angular acceleration, in respective steps 204', 205' and 206', completely analogous to the steps 204, 205, and 206 previously described.

The cycle may possibly be deactivated by the vehicle user at any time by acting on a specific command or even by stopping the vehicle under the suspension control.

COMPARATIVE EXAMPLE

The results obtained by a software multi-body simulations, as confirmed by experimental data, by simulating the so-called maneuver "highside" on a motorbike equipped with the control system of the stability of the vehicle that implements the method according to the invention, are described in this paragraph. The maneuver "highside" includes a sharp initial acceleration outgoing a curve, causing the rear drive wheel slip and his loss of grip. The pilot, due to the loss of grip, closes the gas to avoid slipping and trying to grip the rear wheel suddenly, with the consequent generation of a lateral force of the impulsive type to the rear wheel, which tends to unseat the pilot catapulting upwards.

FIG. 6 shows the trends over time of the roll angular speed $\dot{\phi}$ for a passive suspension (dashed line) and a electronically controlled suspension according to the method of the present invention (solid line). As you can see, the control method allows to reduce the peaks of the roll angular speed $\dot{\phi}$ as well as to dampen the oscillations more quickly.

It has also been verified that, compared with completely passive configurations, in same conditions, to the motorcycle controlled by the method according to the invention the following values are considerably lower:

$$\text{Stability index} = \frac{1}{N}\sqrt{\sum_{k=1}^{N}\dot{\phi}(k)^2};$$

$$\text{Feeling index} = \frac{1}{N}\sqrt{\sum_{k=1}^{N}\dot{\delta}(k)^2}$$

The "stability index" represents the mean square value of the roll angular speed $\dot{\phi}$, while the "feeling index" represents the mean square value of the angular speed of the steering $\dot{\delta}$ around its own axis. These two sizes are therefore representing the motorbike oscillations around two different axes, and therefore, as these are small, the greater are the stability and the driving comfort of the motorbike.

The skilled person may make numerous additions, alterations, or substitutions of elements with others functionally equivalent to the description above given of the method and system of controlling the stability of a two-wheeled vehicle, in order to satisfy contingent specific requirements, but without departing from the scope of the enclosed claims.

Appendix: Determination of the Reference Force

In this Appendix the steps which have led to the determination of the formula (1), by which it is possible to calculate the reference force $F_{s,2}^0$ to be imposed to the second suspension, will be illustrated here.

In order to compensate the torques of the forces generated by the contact of the tire with the ground, it is necessary to apply to the vehicle an appropriate damping torque. You can hypothesize, therefore, to ideally hook the vehicle by a damper to a reference system integral with it, except for the rotation around the longitudinal axis. The torque generated $T_{stab}$ by this ideal damper is therefore equal to:

$$T_{stab} = -c_{roll}\dot{\phi}$$

wherein $c_{roll}$ is the damping coefficient of the ideal damper and $\dot{\phi}$ is the roll angular speed.

The vertical forces acting at the contact points between the front tire (first wheel) and rear tire (second wheel) and the road are given by:

$$F_{z,1} = F_{s,1}\tau_1 \cos \epsilon \cos \beta_1$$

$$F_{z,2} = F_{s,2}\tau_2 \cos \epsilon \cos \beta_2$$

wherein:
$F_{s,1}$ and $F_{s,2}$ are the forces imposed on the first and second suspension;
$\tau_1$ and $\tau_2$ are the lever ratios of the first suspension (front) and the second suspension (rear);

$\epsilon$ is the Caster angle of the motorbike
$\beta_1$ and $\beta_2$ are the camber angles of the first suspension (front) and the second suspension (rear)

The camber angle $\beta_1$ can be expressed as follows:

$$\beta_1 = \beta_2 + \delta \sin \epsilon$$

wherein $\delta$ is the steering angle of the motorbike.

Since this size is generally limited, it can be approximated in the following way:

$$\beta_1 \approx \beta_2 = \phi$$

wherein $\phi$ is the roll angle.

The horizontal forces acting on the first and second wheel can be modeled as follows:

$$F_{y,1} = F_{z,1}\mu_{y,1}(\lambda_1,\phi_1,\alpha_1,F_{z,1})$$

$$F_{y,2} = F_{z,2}\mu_{y,2}(\lambda_2,\phi_2,\alpha_2,F_{z,2})$$

wherein $\mu_y$ is a non-linear characteristic that binds the vertical load acting on the wheel to the horizontal force. It depends on various factors, among which slippage $\lambda$, the camber angle (here approximated with the roll angle $\phi$), the side-slip angle $\alpha$ and the vertical load $F_z$.

The torques reported to the center of gravity of the motorbike by the vertical and horizontal forces in correspondence to the first and the second wheel are then given by the following formulas:

$$T_{s,1} = F_{s,1}\cos\phi\tau_1\cos\epsilon h(\mu_{y,1}\cos\phi + \sin\phi)$$

$$T_{s,2} = F_{s,2}\cos\phi\tau_2 h(\mu_{y,2}\cos\phi + \sin\phi)$$

wherein h is the height of center of gravity.

To determine the values of the forces that suspensions must exert you can impose that the torque generated by the suspensions is equal to the torque generated by the ideal damper, from which we have:

$$F_{s,2}\cos\phi\tau_2\cos\epsilon h(\mu_{y,2}\cos\phi + \sin\phi) + F_{s,1}\cos\phi\tau_1 h(\mu_{y,1}\cos\phi + \sin\phi) = -c_{roll}\dot{\phi}$$

From this formula it is possible to determine the reference force to be imposed to the second wheel:

$$F_{s,2}^0(t) = -\frac{\tau_1}{\tau_2}\frac{\mu_{y,1}\cos\phi + \sin\phi}{\mu_{y,2}\cos\phi + \sin\phi}\cos\epsilon F_{s,1}$$

$$-\frac{1}{\cos^2\phi}\frac{1}{\mu_{y,2}\cos\phi + \sin\phi}\frac{c_{roll}}{\tau_2 h}\dot{\phi}$$

Since the term $\mu_{y,2}\cos\phi + \sin\phi$ difficult to be determined, it is possible to neglect the contribution of horizontal forces, considering only the contribution of the vertical forces. Therefore it can be obtained:

$$F_{s,2}^0(t) = -\frac{\tau_1}{\tau_2}\frac{\mu_{y,1}}{\mu_{y,2}}\cos\epsilon F_{s,1}$$

$$-\frac{1}{\cos^2\phi}\frac{1}{\mu_{y,2}}\frac{c_{roll}}{\tau_2 h}\dot{\phi}$$

Assuming that the lever ratios and the non-linear characteristics of the street are similar to each other and disregarding the Caster angle we obtain the formula (1):

$$F_{s,2}^0 \approx -F_{s,1} - \frac{1}{\cos^2(\phi)}\text{sgn}(\phi)\tilde{c}_{roll}\dot{\phi}$$

The invention claimed is:

1. Method of controlling the stability of a two-wheeled vehicle comprising a first wheel with an associated first suspension and a second wheel with an associated second suspension, said method comprising:
   detecting a signal representing the roll angle and detecting a signal representing the roll angular speed of said vehicle;
   detecting a signal representing a first force exerted by said first suspension;
   determining a drive signal representing a reference force to be imposed on said second suspension as a function of said signals representing the roll angle, the roll angular speed, and the first force.

2. Method of controlling the stability of a two-wheeled vehicle according to claim 1, wherein determining the drive signal representing the main compensation force includes applying a mathematical algorithm according to which the reference force is given by the following formula:

$$F_{s,2}^0(t) = A(F_{s,1}(t)) + B(\phi(t), \dot{\phi}(t))$$

wherein:
$F_{s,2}^0$ is the reference force to be imposed on the second suspension;
$F_{s,1}$ is the first force exerted by the first suspension;
$\phi$ is the roll angle of the vehicle;
$\dot{\phi}$ is the roll angular speed of the vehicle;
t is the considered point of time;
A is a first term function of the force exerted by the first suspension, and B is a second term function of the vehicle roll angle and of the vehicle roll angular speed, selected so that:
the first term A is, as an absolute value, increasing as the absolute value of the force exerted by the first suspension increases and has a sign opposed to the sign of the force exerted by the first suspension;
the second term B is, as an absolute value, increasing as the absolute value of the vehicle roll angle increases and has a sign opposed to the sign of the vehicle roll angle if the roll angle speed is positive, and has the same sign as the vehicle roll vehicle angle if the roll angular speed is negative, said second term B being, as an absolute value, increasing as the absolute value of the roll angular speed increases.

3. Method of controlling the stability of a two-wheeled vehicle (100) according to claim 1, wherein determining the drive signal representing the reference force includes applying a mathematical algorithm according to which the reference force is determined by the following formula:

$$F_{s,2}^0(t) = -F_{s,1}(t) - \frac{1}{\cos^2(\phi(t))} \text{sgn}(\phi(t)) \tilde{c}_{roll} \dot{\phi}(t)$$

wherein:
$F_{s,2}^0$ is the reference force of the second suspension;
$F_{s,1}$ is the first force exerted by the first suspension;
$\phi$ is the roll angle of the vehicle;
$\dot{\phi}$ is the roll angular speed of the vehicle;
$\tilde{c}_{roll}$ is a predetermined calibration parameter, possibly adjustable for changing the vehicle response;
t is the considered point of time.

4. Method of controlling the stability of a two-wheeled vehicle according to claim 1, further comprising determining a drive signal representing an auxiliary reference force to be imposed on said first suspension when the reference force is unreachable by the second suspension, said auxiliary reference force being adapted to compensate at least a portion of the reference force which is unreachable by the second suspension.

5. Method of controlling the stability of a two-wheeled vehicle according to claim 1, comprising enabling the control so that the roll control is enabled when said roll angle is greater than or equal, as an absolute value, to a predetermined threshold roll angle and when the oscillation frequency of the vehicle is greater than or equal to a predetermined threshold minimum frequency.

6. Method of controlling the stability of a two-wheeled vehicle according to claim 5, wherein said enabling the control comprises detecting a signal representing the roll angular acceleration of the vehicle and determining a frequency function from said roll angular acceleration and said roll angular roll speed, such that when the frequency function is greater than a predetermined threshold frequency function value, said oscillation frequency is greater than said threshold frequency.

7. Method of controlling the stability of a two-wheeled vehicle according to claim 5, comprising disabling the control system, such that the control is disabled when the roll angle is smaller, as an absolute value, than said predetermined threshold roll angle and/or when the oscillation power of the vehicle is smaller than a predetermined threshold oscillation power.

8. System for controlling the stability of a two-wheeled vehicle comprising a first wheel with an associated first suspension and a second wheel with an associated second suspension, said control system comprising:
   a roll angle detector and a roll angle speed detector of said vehicle respectively adapted to generate signals representing said roll angle and said roll angular speed;
   a detector of a first force exerted by said first suspension adapted to generate a signal representing said first force;
   a main drive module adapted to generate a drive signal representing a reference force to be imposed on the second suspension, wherein said signal representing the reference force is determined from said signals representing the roll angle, the roll angular speed and the first force.

9. System for controlling the stability of a two-wheeled vehicle according to claim 8, further comprising an auxiliary drive module adapted to generate a drive signal representing an auxiliary reference force to be imposed on said first suspension when the reference force is unreachable by the second suspension.

10. System for controlling the stability of a two-wheeled vehicle according to claim 8, wherein said first and second suspensions of the vehicle are of the semi-active type having variable dampening coefficients, and wherein said drive signals representing the reference force and/or the auxiliary reference force are adapted to drive modules for actuating the suspensions for modifying said variable dampening coefficients.

11. System for controlling the stability of a two-wheeled vehicle according to claim 8, comprising a module for enabling the control so that the roll control is enabled when said roll angle is greater than or equal, as an absolute value, to a predetermined threshold roll angle and/or when a magnitude representing the vehicle oscillation frequency is greater than or equal to a magnitude representing a predetermined minimum threshold frequency.

12. System for controlling the stability of a two-wheeled vehicle according to claim 11, further comprising a module for disabling the control system in order to generate a signal disabling the roll control when the roll angle is smaller, as an absolute value, than said predetermined threshold roll angle and/or when a magnitude representing the oscillation power is smaller than a predetermined threshold value.

* * * * *